United States Patent [19]

Maeda et al.

[11] Patent Number: 4,788,674
[45] Date of Patent: Nov. 29, 1988

[54] OPTICAL DISC RECORD REPRODUCING APPARATUS

[75] Inventors: Shigemi Maeda, Yamatokoriyama; Toshihisa Deguchi, Nara; Takeshi Yamaguchi, Tenri; Shozou Kobayashi, Nara, all of Japan

[73] Assignee: Sharp Kabushiki Kaisha, Osaka, Japan

[21] Appl. No.: 902,593

[22] Filed: Sep. 2, 1986

[30] Foreign Application Priority Data

Sep. 2, 1985 [JP] Japan ................................. 60-194120
Sep. 2, 1985 [JP] Japan ................................. 60-194121
Nov. 25, 1985 [JP] Japan ................................. 60-265574

[51] Int. Cl.$^4$ ......................... G11B 7/00; G11B 27/36
[52] U.S. Cl. ...................................... 369/54; 369/106; 369/116; 369/124
[58] Field of Search ................. 369/54, 58, 106, 116, 369/124, 111, 100, 110, 109, 59, 174; 346/76 L

[56] References Cited

U.S. PATENT DOCUMENTS

| | | | |
|---|---|---|---|
| 4,425,637 | 1/1984 | Tanaka | 369/109 |
| 4,488,277 | 12/1984 | McFarlane | 369/54 |
| 4,516,235 | 5/1985 | Tarzaiski | 369/116 |
| 4,646,103 | 2/1987 | Sugiyama | 369/54 |

Primary Examiner—Alan Faber
Attorney, Agent, or Firm—Birch, Stewart, Kolasch & Birch

[57] ABSTRACT

An optical disc apparatus provided with a recording correcting system for controlling variations in the recorded bit length. The recording correcting system may be controlled not only while the apparatus is put to work, but also during unoccupied times when the recording, reproducing, and erasing operations are not required from a higher level apparatus. Also, the controlling operation may be performed so that the value of the record correction may be renewed at proper time intervals. The repetition of the correction trial at the proper interval allows a time lapse after the apparatus power-supply is put to work to occur with no undesirable effects and the characteristic variation between respective discs during the disc exchange can be coped with.

8 Claims, 7 Drawing Sheets

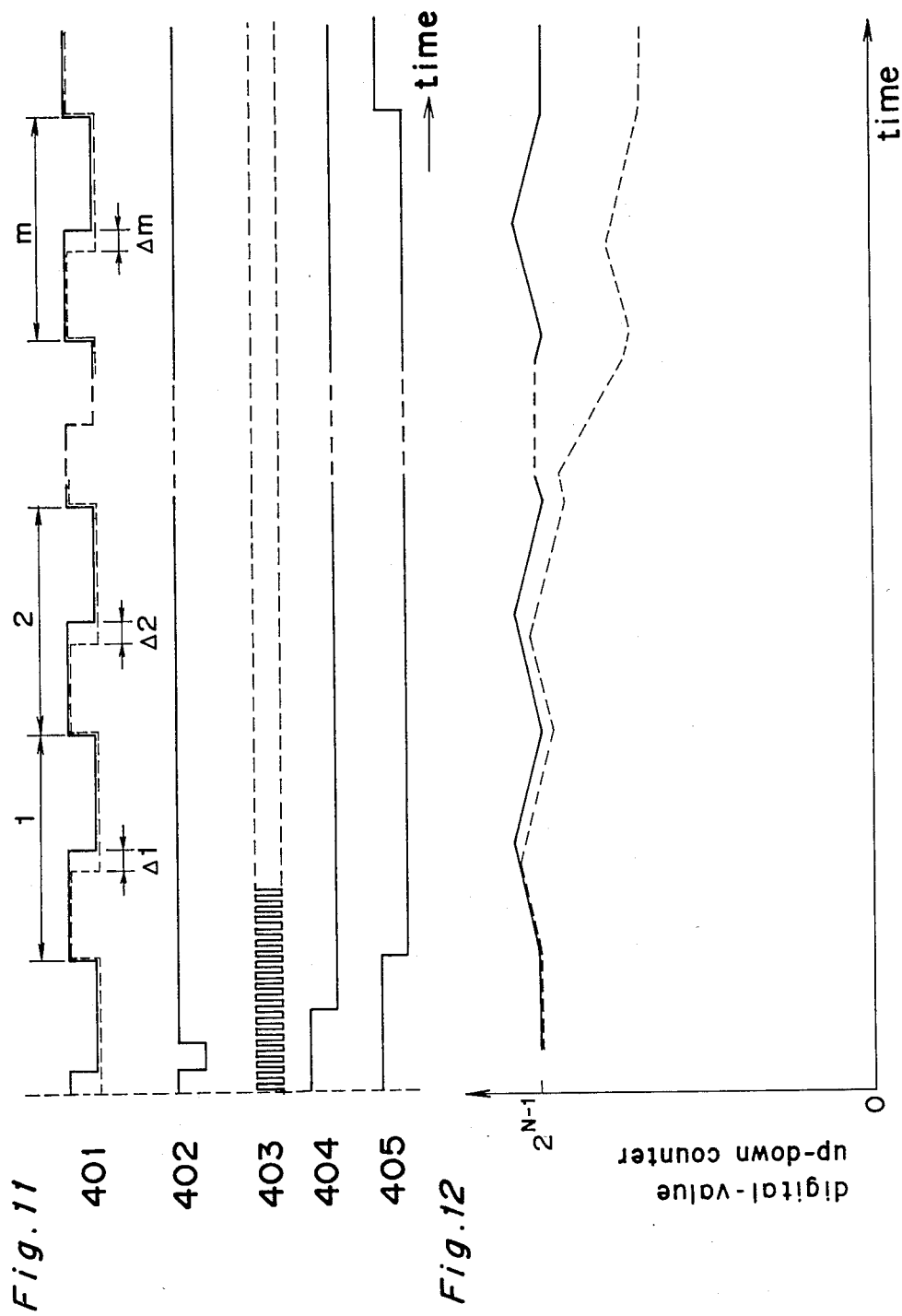

OPTICAL DISC RECORD REPRODUCING APPARATUS

BACKGROUND OF THE INVENTION

The present invention relates to an optical disc reproducing apparatus which outputs bits corresponding to recorded information on the disc by scanning with a laser beam to reproduce the recorded information through variation in the detection levels of the bit signals.

In recent years, optical disc apparatus using laser beams have been used. In general, an optical disc may have as much as twice the record track density as a magnetic disc to compose a large capacity memory, and is characterized in that the laser beam may be focused on the medium surface of disc, the positioning of the beam being performed through non-contact by a pregroove track prior to reading information on the disc, so that the recording medium may be removable.

Also, the various known apparatus have been provided because of differences in recording and reproducing principles or differences in a light source for recording, reproducing and erasing use on a record medium. For example, in the magneto optic disc apparatus, a semiconductor laser is used as the light source for recording, reproducing and erasing information, a magnetic film is prepared by the evaporation or sputtering method on the disc as the recording medium to record information through variation in the magnetizing direction in accordance with the information data.

In the conventional magneto optic disc apparatus, the temperature of the magnetic film is locally raised to near the curie point by the application of a recording laser beam of an output level higher generally as compared to the reproducing beam, the magnetizing direction is varied by an application of the external magnetic field to effect a recording operation. In the digital information record, the reverse interval of the magnetic polarity to be formed by the use of the above-described method or the interval between the same polarities is varied in accordance with the information to be recorded.

In the optical disc apparatus, the recording conditions vary because of variations in recording sensitivity from disc to disc, in the recording position of the disc, change in the beam power of the laser element, and changes in the recording sensitivity by the ambient temperature. As a result, the window margin of the reproduction signal is lost by the variation of the recording bit length, so that a recording density taking this variation into account is required to be set, thus resulting in an obstacle to attaining a higher recording density.

Also, in the conventional data storing method used in the magneto optic disc apparatus, the recorded bit length along the disc rotating direction of the magnetized reversing portion is required to be strictly controlled. The factors for deciding the recorded bit length are the recording laser power and the recording sensitivity of the magnetic medium. The variation in recording laser power is caused by the variation in the output characteristics of the semiconductor laser through aging. Also, the recording sensitivity in the magnetic medium is difficult to be controlled in the individual optical magnetic disc and usually has a variation width. The variation in the recording laser power and the recording sensitivity of the magnetic medium may be expected by the circumstance of use, particularly the ambient temperature of the optical magnetic disc apparatus.

The changes in the recorded bit length caused by the above-described variation cause a reduction in the tolerance with respect to detection window width in the digital recording or a reduction in the signal-to-noise ratio by overlapping onto the side of the short length of the recorded bit length, thus resulting in deterioration in the data error ratio in the worst condition.

SUMMARY OF THE INVENTION

Accordingly, an object of the present invention is to provide an optical disc apparatus provided with a compensating system for controlling the variation in the recorded bit length.

In accomplishing this object, according to one preferred embodiment of the present invention, a laser beam generating means for recording use is provided which generates optional laser power. A recording means which sequentially generates laser beams of different power from the laser beam generating means is used to form recorded bits on a disc. A laser power detecting means detects the power of the laser beam when the pulse width of the reproduction signals with respect to the recorded bits becomes a given length. The recording of the information is accomplished in accordance with the detected power of the laser beam.

The present invention also comprises a laser beam generating means for generating laser beams of optional pulse width, a recording means for sequentially generating laser beams of different pulse width from the laser beam generating means to form recorded bits on a disc, a laser beam pulse width detecting means for detecting the pulse width of the laser beam when the pulse width of the reproduction signals with respect to the recorded bit becomes a given width, and the information is recorded on the disc according to the detected pulse width of the laser beams.

Furthermore, the optical disc apparatus of the present invention comprises, in a disc apparatus for information processing use employing an optical disc medium which may be rewritten on, a recording means for recording on the optical disc medium pulse strings having a single period, a difference detecting means for obtaining the average difference between a high level period and a low level period of the reproduction binary signal of the recorded pulse string, a record compensating means for compensating the duty ratio of the pulse string of the information to be recorded, so that the duty ratio of the reproduction pulse may become constant, in accordance with the above-described difference in the recording means, a controlling means for controlling the record compensation, the difference detection by the difference detecting means, and the compensation by the record compensating means. In order to make the duty ratio of the record pulse to be reproduced in this manner constant, a pulse string having the single period of an integer multiple of the record bit period is prerecorded on a trial basis to obtain the shift of the duty ratio from the duty ratio of the reproduced signal. Also, the duty ratio is modified in advance in the recording of the information in accordance with the shift to keep the duty ratio of the reproduction pulse at a given value.

BRIEF DESCRIPTION OF THE DRAWINGS

These objects and features of the present invention will become apparent from the following description taken in conjunction with the preferred embodiment thereof with reference to the accompanying drawings, in which.

Figure 4:
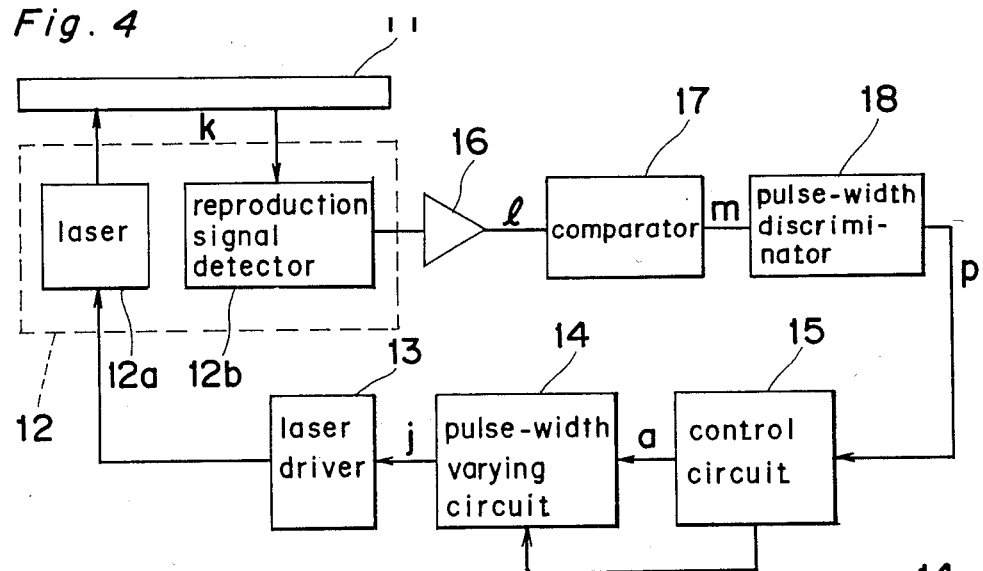
FIG. 4 is a block circuit diagram showing the basic construction of a second embodiment of the present invention.
Figure 8:
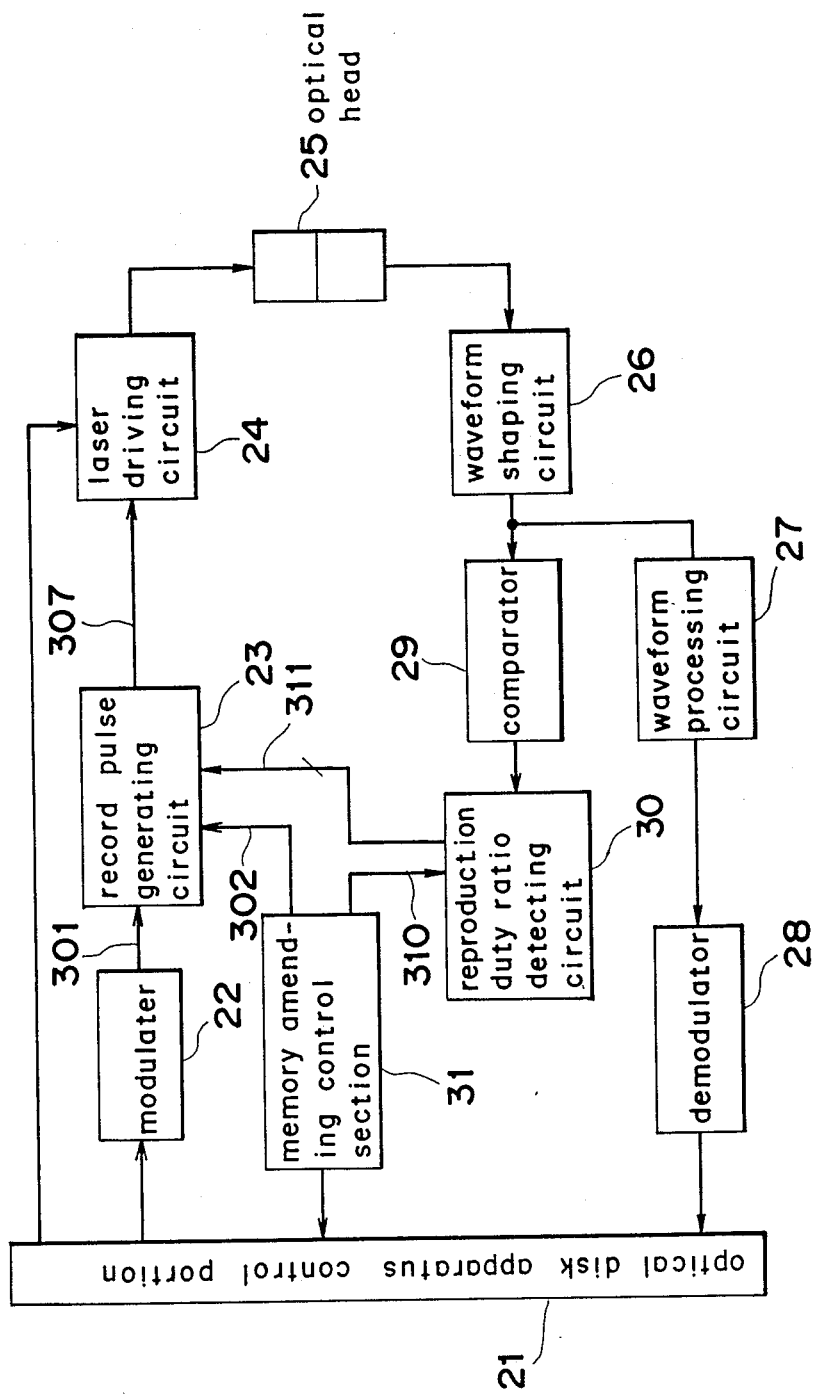
Figure 9:
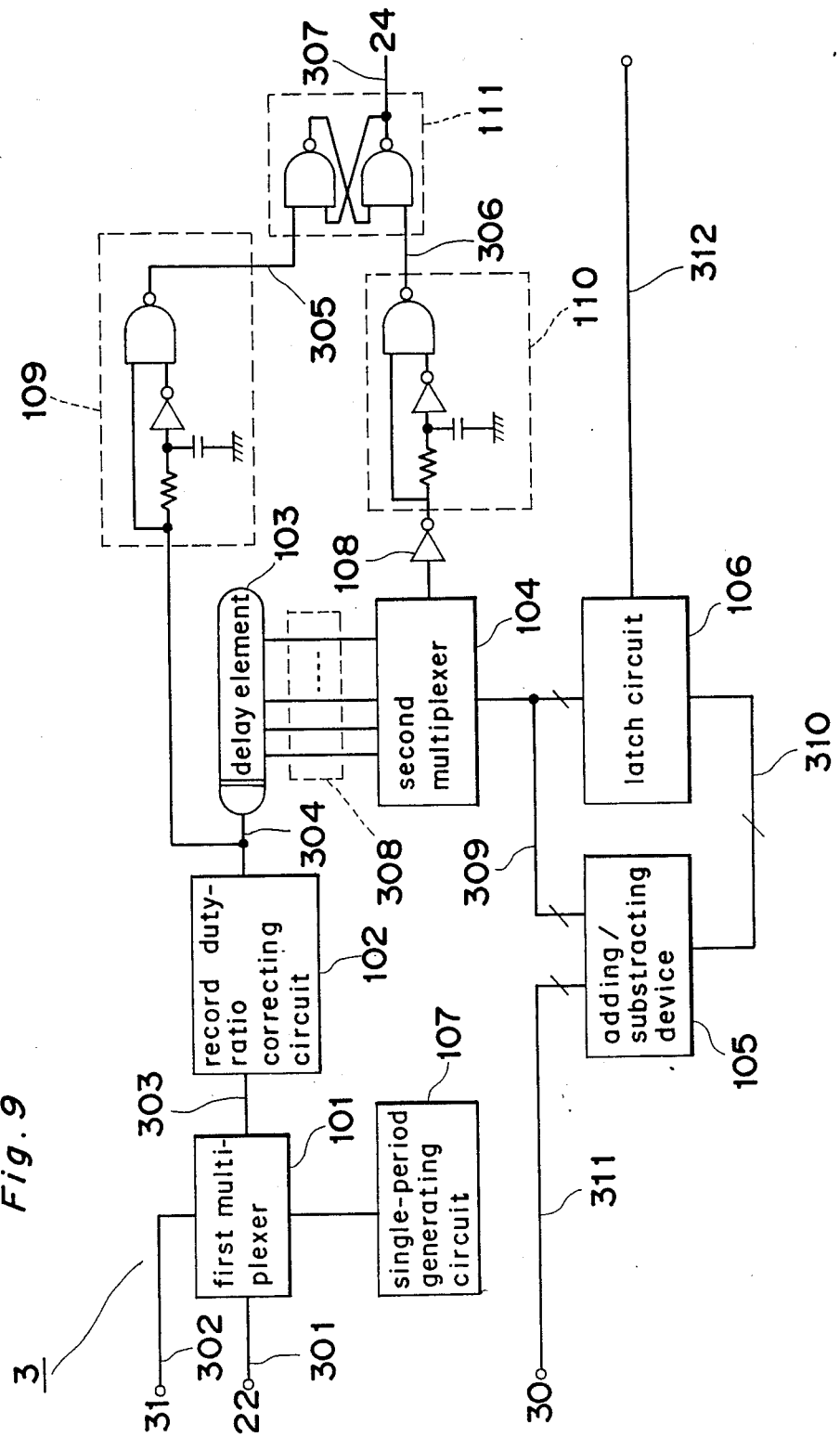
Figure 10:
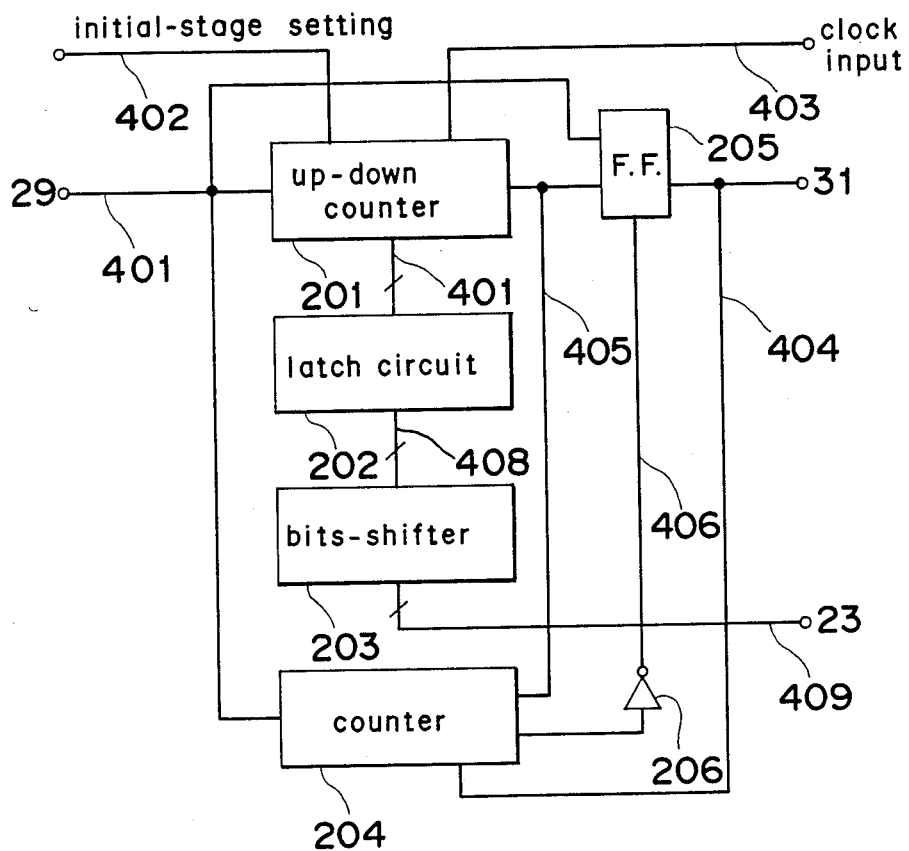

FIG..7 is a graph showing of the signal wave-forms generated in the embodiment of FIG. 4;

FIG. 8 is a block circuit diagram of a magneto optic disc apparatus provided with a record compensating system in a third embodiment of the present invention;

FIG. 9 is a concrete circuit diagram of the record pulse generating circuit in the embodiment of FIG. 8;

FIG. 10 is a circuit diagram of the reproduction duty ratio detecting circuit in the embodiment of FIG. 8;

FIG. 11 is a time chart of the various signals in the reproduction duty ratio detecting circuit in the embodiment of FIG. 8; and FIG. 12 is a graph of the digital values of the up, down counter in the embodiment of FIG. 8.

DETAILED DESCRIPTION OF THE INVENTION

Before the description of the present invention proceeds, it is to be noted that like parts are designated by like reference numerals throughout the accompanying drawings.

FIRST EMBODIMENT

Figure 1:
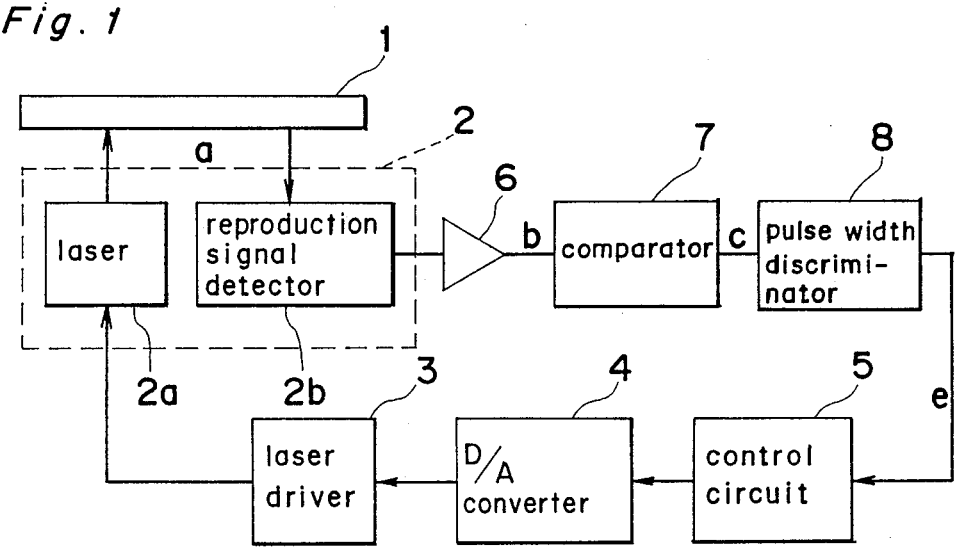
FIG. 1 is a block circuit diagram showing the basic construction of a first embodiment of the present invention.

Referring now to FIG. 1, the basic construction of an optical disc apparatus according to a first preferred embodiment of the present invention is shown, which includes an optical disc 1, and an optical pickup 2 which is adapted to record and reproduce information on the optical disc 1. The optical pickup 2 is composed of a laser 2a for generating laser beams of variable laser power, and a reproduction signal detector 2b. Reference character 3 is a laser driver for driving the laser 2a. Reference character 4 is a D/A converter which supplies a driving signal to the laser driver 3. Reference character 5 is a controlling circuit which feeds data to the D/A converter 4 so as to generate laser beams of different laser power sequentially with constant frequency prior to the actual information recording. Reference character 6 is an amplifier for amplifying the output of the reproduction signal detector 2b. Reference character 7 is a comparator which is adapted to slice in level the output of the amplifier 6 to output a pulse signal. Reference character 8 is a pulse width discriminator which is adapted to discriminate the size relation between the pulse width of the pulse from the comparator 7 and a given value.

Figure 2:
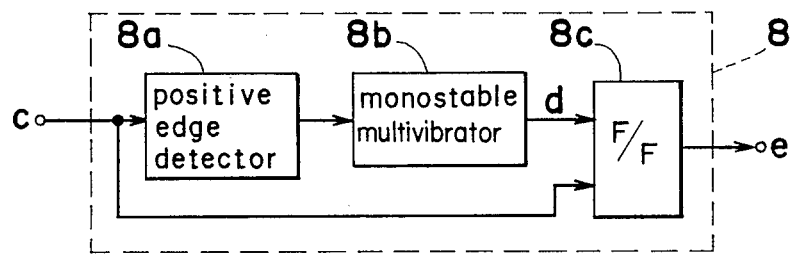
FIG. 2 is a block diagram showing the construction of a pulse width discriminator in the embodiment of FIG. 1.

FIG. 2 shows the construction of the pulse width discriminator 8. Reference numeral 8a is a positive edge detector for detecting the rising edge of the pulse from the comparator 7. Reference character 8b is a monostable multivibrator which outputs reference pulses of a constant pulse width for each of the rising edges detected by the positive edge detector 8a. Reference character 8c is a flip-flop which is adapted to sample the pulse from the comparator 7 by the rising edge of the reference pulse from the monostable multivibrator 8b. The flip-flop 8c reverses output when the pulse length is at least equal to the level of the reference pulse.

Figure 3:
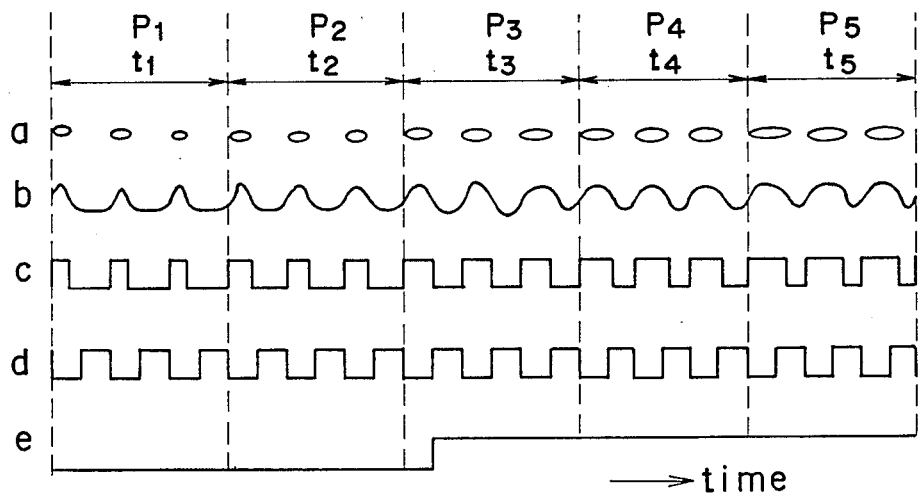
FIGS. 3; a-e are graphs showing the signal waveforms generated in the embodiment of FIG. 1.

FIG. 3 shows the signal waveforms generated at the various portions of the optical disc apparatus, wherein reference character a is the recorded bit of the optical disc, reference character b is the output of the amplifier 6, reference character c is the output of the comparator 7, reference character d is the output of the monostable multivibrator 8b, reference character e is the output of the flip-flop 8c.

The operation of the optical disc apparatus, wherein laser beam power is provided to obtain a duty ratio of the reproduction signal of 50% will be described hereinafter.

The controlling circuit 5 feeds the data to D/A converter 4 to sequentially vary the laser driving current in accordance with signals of a constant frequency, the data is converted into the an analog signal by the D/A converter 4 and is fed to the laser driver 3. The laser driver 3 drives the laser 2a of the optical pickup 2 in accordance with the analog signal to record a bit at constant frequency, which is difference in laser beam power sequentially in the rotating direction of the optical recording disc 1. When recordings are performed sequentially with the laser beam power being P1, P2, - - - P5 respectively in the periods t1, t2, - - - , t5, recorded bits shown in FIG. 3a are formed on the optical disc 1. The laser beam powers P1 to P5 sequentially increase in each period t1, to t5. Accordingly, the recorded bit a has a width shortest in the period t1, and the longest in the period t5.

The recorded bit a formed on the optical disc 1 is then detected by the reproduction signal detector 2b, amplified by the amplifier 6, converted into the signal shown in FIG. 3b, and thereafter is sliced in level by the comparator 7 to provide the pulse signal of FIG. 3c. The pulse signal c is shortest in pulse length during the period t1, with the periods t2, t3, - - - t5 sequentially longer in pulse length. In the pulse signal c, the rising edge is detected by the positive edge detector 8a in the pulse width discriminator 8, and the monostable multivibrator 8b is started by this rising edge. As a result, every time a rising edge of the pulse signal c is generated from the monostable multivibrator 8b, a reference pulse signal d of 50% in duty ratio is outputted.

In the periods t1 and t2, the duty of the pulse signal c is deviated, and the high-level pulse length of the pulse signal c is shorter than the low-level pulse length of the reference pulse signal d. Thus, the output e of the flip-flop 8c remains at the low level.

Then, in the period t3, when the high-level pulse length of the pulse signal c becomes equal to the low-level pulse length of the reference pulse signal d, the output e of the flip-flop 8c is reversed to the high level. Thereafter, in the periods t4, t5, the high-level pulse length of the pulse signal c becomes longer than the low-level pulse length of the reference pulse signal d, so that the output e of the flip-flop 8c is kept at the high level.

The duty ratio of the pulse signal c in the period t3 during which the output e of the flip-flop 8c is reversed, is 50%, and the laser beam power in the period 3t is P3. Accordingly, it is judged that the laser beam power is required to become P3 in order to perform optimum recording in which the duty ratio of the reproduction signal is 50%. Thereafter, the actual information is recorded by this laser beam power P3.

In this embodiment, the decision is performed by the use of the high level pulse length of the pulse signal c and the rising edge, but it may be performed by the use of the low level pulse length of the pulse signal c and the falling edge. Furthermore, a higher precision setting of the laser beam power may be made if the decision is performed by the use of both the high and low level pulse lengths of the pulse signal c. As described hereinabove, in this embodiment, the precording operation is performed with the laser beam power being sequentially changed to provide an optimal laser beam power when the pulse width of the reproduction signal becomes a given value. Thus, even if the recording sensitivity is different for each disc or the power of the laser beam is varied in accordance with temperature changes, the optimum recording conditions may be set to improve the reliability of the reproduction signal and to realize a higher recording density.

SECOND EMBODIMENT

FIG. 4 shows the basic construction of an optical disc apparatus according to a second preferred embodiment of the present embodiment. Reference character 11 is an optical disc corresponding to the one of the first embodiment. Reference character 12 is an optical pickup which is adapted to record and reproduce the information of the optical recording disc 11. The optical pickup 12 is composed of a laser 12a for generating a laser beam of optional pulse width and a reproduction signal detector 12b. Reference character 13 is a laser driver for driving the laser 12a. Reference character 14 is a pulse width varying circuit which feeds a driving signal to the laser driver 13 so as to generate laser beams different in pulse length sequentially with a constant frequency prior to the actual information recording. Reference character 15 is a controlling circuit which feeds a constant frequency pulse signal to the pulse width varying circuit 14 and feeds a selection signal of the multiplexer to be described later. Reference character 16 is an amplifier for amplifying the output of the reproduction signal detector 12b. Reference character 17 is a comparator which slices in level the output of the amplifier 16 to output a pulse signal. Reference character 18 is a pulse width discriminator which determines the size relation between the pulse width of the pulse signal from the comparator 17 and a given value.

Figure 5:
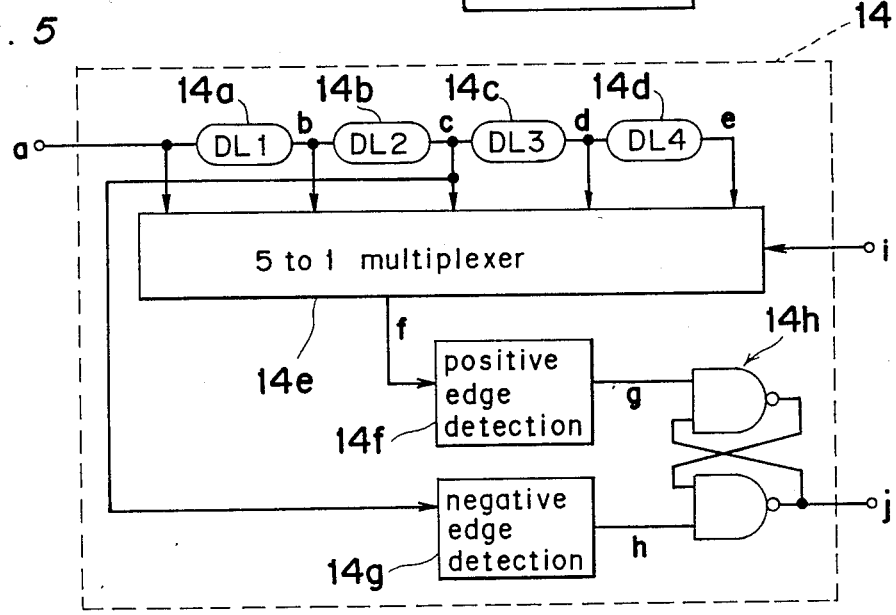
FIG. 5 is a block diagram showing the construction of a pulse width variable circuit in the embodiment of FIG. 4.

FIG. 5 shows the construction of the pulse width varying circuit 14. Reference characters 14a, 14b, 14c, 14d are delay lines which delay the input signals respectively by time t. The delay line 14a delays by time t a constant frequency of pulse signal from the controlling circuit 15 to output it, the delay line 14b delays by time 2t, the delay line 14c delays by time 3t, the delay line 14d delays by time 4t. Reference character 14e is a multiplexer which selectively outputs, in accordance with the selection signal from the control circuit 15, the constant frequency pulse signals from the controlling circuit 15 and one of the pulse signals to be outputted from the delay lines 14a, 14b, 14c, 14d. Reference character 14f is a positive edge detecting circuit for detecting the rising edge of the output signal of the multiplexer 14e. Reference character 14g is a negative edge detecting circuit for detecting the falling edge of the output signal of the delay line 14b. Reference character 14h is an R-S flip-flop which is reset by the output of the positive edge detecting circuit 14f and is set by the output of the negative edge detecting circuit 14g.

Figure 6:
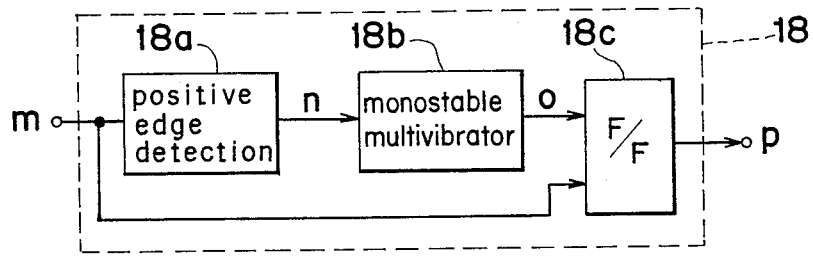
FIG. 6 is a block diagram showing the construction of a pulse width discriminator in the embodiment of FIG. 4.

FIG. 6 shows the construction of the pulse width discriminator 18. Reference character 18a is a positive edge detecting circuit for detecting the rising edge of the pulse signal from the comparator 17. Reference character 18b is a monostable multivibrator which outputs a reference pulse of a constant pulse width for each of the rising edges detected by the positive edge detecting circuit 18a. Reference character 18c is a flip-flop which samples the pulse from the comparator 17 by the rising edge of the reference pulse signal from the monostable multivibrator 18b. The flip-flop 18c is reversed in output by comparing the size of the low level pulse width of the reference pulse with the high level pulse width of the pulse from the comparator 17.

Figure 7:
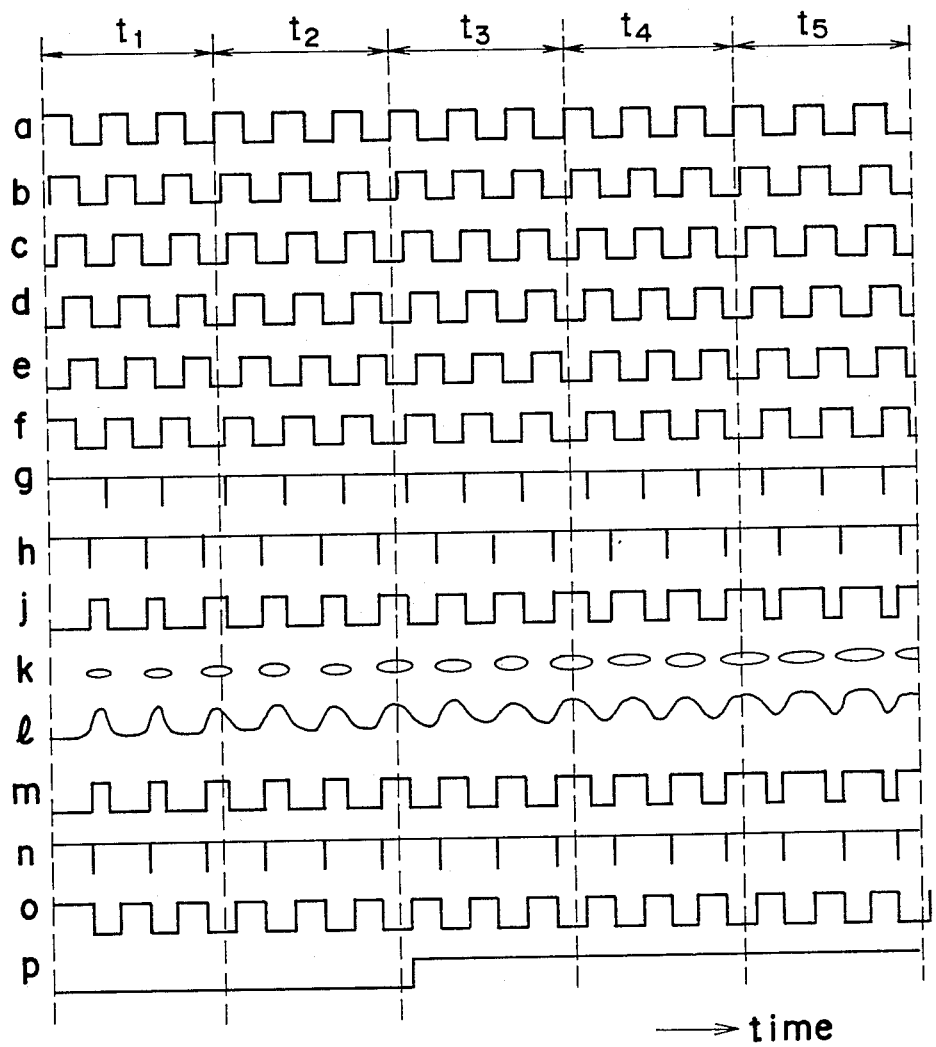

FIG. 7 shows the signal waveforms generated at the various portions of the optical disc apparatus of FIG. 4. Reference character a is a constant frequency pulse signal which is fed to the pulse width varying circuit 14 from the controlling circuit 15. Reference characters b, c, d, e are outputs of the delay lines 14a, 14b, 14c, 14d respectively. Reference character f is the output of the multiplexer 14e. Reference character g is an output of the positive edge detecting circuit 14f. Reference character h is an output of the negative edge detecting circuit 14g. Reference character j is an output of the R-S flip-flop 14h. Reference character K represents recorded bits of the optical disc 11. Reference character l is an output of the amplifier 16. Reference character m is an output of the comparator 17. Reference character n is an output of the positive edge detecting circuit 18. Reference character o is an output of the monostable multivibrator 18b. Reference character p is an output of the flip-flop 18c.

The operation of the optical disc apparatus in the embodiment of FIG. 4 will be described hereinafter.

The pulse signal a of a constant frequency from the controlling circuit 15 is fed to the pulse width varying circuit 14. In the pulse width varying circuit 14, the multiplexer 14e outputs a plurality of signals having a width equal to the pulse signal a in the periods t1 to t5 in accordance with the selection signal from the controlling circuit 15, such as the pulse signal b in period t2 which is delayed by time t from the pulse signal a, the pulse signal c in period t3 which is delayed by time 2t from the pulse signal a, the pulse signal d in period t4 which is delayed by time 3t from the pulse signal a, and the pulse signal e in period t5 which is delayed by time 4t from the pulse signal a. The positive edge detecting circuit 14 outputs impulse g in response to rising edge of the output signal f of the multiplexer 14e and the negative edge detecting circuit 14g outputs impulse h in response to the falling edge of the output signal of the delay line 14b.

When the output signal a of the controlling circuit 15 is outputted as the signal f from the multiplexer 14e by the selection signal i from the controlling circuit 15 in the period t1, the R-S flip-flop 14h is reset by the rise of the signal a and is set by the fall of the signal c delayed by time 2t from the pulse signal a, so that the output j of the R-S flip-flop 14h is a signal shortened by 2t in pulse width with respect to the signal a. As described hereinafter, the output j of the R-S flip-flop 14h then becomes a signal which is shortened by t in pulse width with respect to the signal a by application of the signal b and the signal c to the positive and negative detection circuits 14f and 14g. In the period t3, the R-S flip-flop 14h is reset by the rise of the signal c and is set by the fall of the signal c, so that the output j becomes a signal of pulse width which has no increase or decrease from the signal a. In the period t4, the output j becomes a signal which is lengthened by t in pulse width with respect to the signal a by the signal d and the signal c applied to the detection circuits 14f and 14g. In the period t5, the output j becomes a signal which is lengthened by 2t in pulse width with respect to the signal a by application of the signal e and the signal c to detection circuits 14f and 14g. The signal j of varying pulse width in the periods t1, t2, t3, t4, t5 is sequentially fed to the laser driver 13. The laser driver 13 drives the laser 21a of the optical pickup 12 in accordance with this signal j so that a laser beam of pulse width corresponding to the signal j is applied to the rotating optical disc 11. As a result, a recorded bit K which is different respectively in length in the periods t1, t2, - - - t5 is formed on the optical disc 11.

Then, the recorded bit K formed on the optical record disc 11 is detected by the reproduction signal detector 12b of the optical pickup 12, amplified by the amplifier 16 and is converted into the signal l. Thereafter, it is sliced in level by the comparator 17 so that the pulse signal m is provided. This pulse signal m is shortest in pulse width during the period t1 and becomes sequentially longer in periods t2, through t4 to become maximum at the period t5. The rising edge of the pulse signal m is detected by the positive edge detecting circuit 18a in the pulse width discriminator 18, the monostable multivibrator 18b being started by the detection signal n of the rising edge. As a result, a reference pulse signal o of constant pulse width is outputted each time the rising edge of the pulse signal m is inputted to the monostable multivibrator 18b.

In the periods t1 and t2, the duty of the pulse signal m is deviated, the high-level pulse width or signal in is shorter than the low level pulse width of the reference pulse signal o, so that the output p of the flip-flop 18c remains low in level.

Then, in the period t3, when the high-level pulse width of the pulse signal m becomes equal to the low level pulse width of the reference pulse signal o, the output p of the flip-flop 18c is reversed to the high level. Thereafter, in the period t4, t5, the high-level pulse width of the pulse signal m becomes longer than the low-level pulse width of the reference pulse signal o, so that the output p of the flip-flop 18c retains the high level.

The duty ratio of the pulse signal m, i.e., the reproduction signal in the period t3 during which the output p of the flip-flop 18c is reversed is 50%. This is because the pulse width of the laser beam is determined through the selection of the delay signal c in the pulse width varying circuit 14. Accordingly, the pulse width of the laser beam is required to be set through the selection of the delay signal c in order to perform optimum recording wherein the duty ratio of the reproduction signal is 50%. Thereafter, the actual information can be recorded by the laser beam of the selected pulse width.

In this embodiment, the decision is performed by a high level use of the pulse width of the pulse signal m and the rising edge, but it may be performed by the use of a low level pulse width of the pulse signal m and the falling edge. Furthermore, a higher precision setting of the pulse width of the laser beam may be performed if the decision is based on high and low level use of both the pulse widths of the pulse signal m. As described hereinabove, in the second embodiment of the present invention, the recording operation is performed while the pulse width of the laser beam is sequentially changed to select the optimum pulse width of the laser beam which produces a pulse width of the reproduction signal having a given length. Thus, even if the recording sensitivity is different for each disc or the light power of the laser beam is varied due to temperature, the optimum recording conditions may be set to improve the reliability of a reproduction signal and to realize the higher recording density.

THIRD EMBODIMENT

A magneto optic disc apparatus in a third embodiment of the present invention will be described with reference to FIGS. 8 to 12.

In the magneto optic disc apparatus of FIG. 8, the duty ratio of the reproduction signal during the trial recording is detected to suppress variations in the recorded bit length so as to optimize the duty ratio of the recording pulse during the actual recording. In the magneto optic disc apparatus, a controlling portion 21 of the optical disc apparatus feeds to a modulator 22 the information data to be recorded during the recording operation. The modulator 22 modulates the digital information data to feed the data to a record pulse generating circuit 23 as a pulse string. The record pulse generating circuit 23 generates recording pulses from the pulse strings after modulation to feed them to a laser driving circuit 24. The laser driving circuit 24 applies the recording pulse current to the semiconductor laser of an optical head 25 in response to the recording pulse and a control signal from the controlling portion 21 of the optical disc apparatus. The optical head 25 is provided with a semiconductor laser to effect the recording operation on the magneto optic disc.

During reproduction, the waveform of the reproduction signal which has been reproduced from the magnetic optic disc by the optical head 25 is shaped through amplification and band-pass filtering in a waveform shaping circuit 26, then is digitized in a waveform processing circuit 27, is further demodulated by a demodulator 28 and is fed to the control portion 21 of the optical disc apparatus.

Through the reception of a record correcting command from the control portion 21 of the optical disc apparatus during the trial recording operation, a record correction control portion 31 converts the recording pulse string into the pulse string having a single period equal to an integer multiple of the recorded bit period in the record pulse generating circuit 23, and the control portion 21 of the optical disc apparatus controls the laser driving circuit 24 so as to record the record pulse string in the unrecorded zone on the disc. On the other hand, the reproduction signal waveform of the recorded single-period pulse string is shaped in the waveform shaping circuit 26 and, thereafter, is digitized through the level slice to be fed to a reproduction-duty-ratio detecting circuit 30. The reproduction-duty-ratio detecting circuit 30 detects the difference between the time length of the "1" bit of the binary-coded output signal of a comparator 29 and the time length of the "0" bit to input it to the record pulse generating circuit 23.

The record-correction control portion 31 controls the record pulse generating circuit 23 and the reproduction duty-ratio detecting circuit 30 in the record correcting operation.

The record correction in this embodiment will be described hereinafter in more detail.

The record pulse generating circuit 23 shown in FIG. 9 generates a pulse string having the single period equal to an integer multiple of the recorded bit period as a record pulse when the record-correction control portion 31 transmits a signal by the command of the control portion 21, and corrects the duty ratio of the record pulse of the actual information in accordance with the correction amount of the duty ratio detected by the reproduction duty-ratio correcting circuit 30 through the single period pulse string. Namely, when a first multiplexer 101 is switched by a signal on control line 302 from the record-correction control portion 31, a pulse string having a single period generated by a single period generating circuit 107 passes through the first stage of a record duty ratio correcting circuit 102 to apply the correction of the duty ratio of a certain constant value, and continuously passes through a second record duty-ratio correcting circuit, which is described hereinafter, to apply the correction of the duty ratio. The last record pulse string passes through a signal line 307 to go to the laser driving circuit 24. In the second stage of record duty-ratio correcting circuit, the output signal of the first stage of record duty ratio correcting circuit 102 is fed into one input terminal of a flip-flop circuit 111 through an edge detecting circuit 109 for detecting the rising edge by logical differentiation, and also passes through a delay circuit composed of a delay element 103 having a plurality of output taps and a second multiplexer 104 for selecting an output tap of the delay element 103, and is fed to the other input terminal of the flip-flop circuit 111 through an edge detecting circuit 110 for detecting the rising edge by logical differentiation. The output signal of the flip-flop circuit 111 is the record pulse and is fed to the laser driving circuit 24. In the above-described delay circuit, the second multiplexer 104 is used for the selection of a tap from the taps of the $(2^{N-M-1})$ of the delay element 103, but a latch circuit 106 is used for the selection input of the second multiplexer 104. The preset terminal 312 of the latch circuit 106 is set at an early stage in advance to give the selection input value 309 to the second multiplexer 104 when the power supply is turned on. Furthermore, an addition and subtraction device 105 is provided which effects an adding or subtracting operation between the output value of the latch circuit 106 and the value of an input line 311 from the reproduction duty ratio detecting circuit 30 for inputting to the latch circuit 106. When the correction amount which is provided from the reproduction of the trial recorded information is fed to the adding/subtracting device 105 from the reproduction duty-ratio detection circuit 30, the output value of the latch circuit 106 is changed. Also, the first stage of record duty ratio correcting circuit 102 has a certain given amount of bias correction so that the optimum record duty ratio expected in advance may be provided with respect to the initial set value. A signal 401 of the reproduction pulse string in a case where the trial record is performed immediately after the power supply is turned on in accordance with the record conditions is shown in FIG. 11, wherein the record conditions are optimum, a reproduction pulse string where the duty ratio shown in a solid line is 1 is provided.

On the reproduction side, the reproduction signal from the optical head 25, in a case where the single period pulse string is recorded in trial, is processed by the waveform shaping circuit 26, and thereafter is digitized by the comparator 29. Here, for the faithful reproduction of a duty ratio of the reproduction signal in the comparator 29, the level slice is performed with the intermediate value of the envelope of the reproduction signal to use the digitizing system. The reproduction duty-ratio detecting circuit 30 detects the duty ratio of the digital pulse string provided in this manner to recognize the correction amount of the recording conditions to feed it to the record pulse generating circuit 3.

The detailed block diagram of the reproduction duty ratio circuit 30 is shown in FIG. 10. Also, the timing charts of the various signals are shown in FIG. 11. The up, down counter 201 switches direction by the values of "1" and "0" of a reproduction pulse string signal 401 or a record pulse string which has a sufficiently high frequency with respect to the reproduction pulse string as a clock input signal 403. A latch circuit 202 latches the output signal 407 of the up-down counter 201. A bit shifter 203 sends the upper bit, which is equivalent to the average value of the duty-ratio-shift, of the output signal of the latch circuit 202 to the record pulse generating circuit 23 through the control line 311. A flip-flop 205 shows the repetition of the reproduction pulse string. A counter 204 counts the repeating time to decide the operation period of the up-down counter 201.

The operation of the record correction and the correction-amount detection in the magneto optic disc apparatus will be described in accordance with FIGS. 11 and 12. A case will be considered where the reproduction signal 401 of the single-period pulse string recorded in trial is the pulse string which varies from the reproduction duty-ratio shown in the dotted line in FIG. 11. The N bit high-speed up-down counter 201 is initialized by the preset terminal 402 into a $(2^{N-1})$ value prior to the counting. The N bit high-speed up-down counter 201 of the reproduction duty-ratio detecting circuit 30 performs a counting operation of the clock signal 403 when the digital command signal 404 given from the record-correction control portion 31 becomes low in level and the control signal 405 showing the detection period decided by the counter 204 is low in level. When the difference between the period of "1" of the reproduction pulse string and the period of "0" thereof is obtained by the counting across the plurality (m) of reproduction pulse strings, the difference is detected across the reproduction pulse strings m to perform an averaging process. It is to be noted that the signal 406 is used to restore its flip-flop 205 to the initial condition.

When each of the m number of reproduction pulse strings deviates from the duty ratio by a time $\Delta i (i=1, 2, \cdots m)$, the digital value in each time period of the up-down counter 201 is shown by FIG. 12. After the lapse of the trial period shown by the signal 405, the last value $$\left( 2^{N-1} - 2 \left( \sum_{i=1}^{m} \Delta i \right) / Tc \right)$$

is provided. Here reference character Tc is the repeating period of the clock input 403. Also, assuming that the digit of the reproduction pulse string is $m=2^M$, the average variance from the reproduction duty ratio is $$\left(2^{N-1} - 2\left(\sum_{i=1}^{m} \Delta i\right)/Tc\right)/2^M = (2^{N-M-1} - 2\Delta/Tc),$$

wherein $\Delta$ shows the average value of $\Delta i$ ($i=1, 2, \cdots m$), $2^{N-1} > 2^{M+1}\Delta/Tc$. The bit shifter 203 is used with respect to the last value, the upper $(N-M-1)$ bit corresponding to the average value being fed to the record pulse generating circuit 23 through the output line 311. Here the most significant bit shows the direction in which the reproduction bit signal deviates from the reproduction duty ratio. Also, the other $(N-M-2)$ bit shows a value proportional to the average shift amount ($2\Delta/Tc$). However, when the period of the "0" level is longer on the average than the period of the "1" level as the signal 401 shows in the dotted line as the FIG. 11, and output is provided in complement expression of the binary number, the subtraction is performed by complement addition of the adding/subtracting device 105 of the record pulse generating circuit 3.

In the present embodiment, the output data 409 provided by the above-described method as the input data to the record pulse generating circuit 23 in FIG. 9 is directly given to add the correction equivalent to the duty ratio shift amount ($2\Delta/Tc$) during the reproduction time in the subsequent actual information recording. Namely, the value of the latch circuit output 309 showing the correction amount during the trial recording is increased or decreased by the most significant bit of the input line 311 through the use of the adding/subtracting circuit 105 in FIG. 9, or the delay amount 2 for each step of the delay element 103 is required to be $\tau = Tc$. In the first stage of record duty ratio correcting circuit 102, a given bias correction is performed so that the optimum record duty ratio may be provided. When the bias correction is kept properly set, the duty ratio correction amount detected by the reproduction duty ratio detecting circuit 30 is only a small value resulting from aging changes or the variations in the using circumference. As the second stage of record duty-ratio circuits 103 through 106, 108 through 111 provide the correction accuracy of $\pm Tc$ in increments of Tc delay amounts.

After the above correction is over, the recording of the single period pulse string is removed.

The second correcting system shown in the present embodiment may be generally applied to the optical disc apparatus for information processing use employing the optical disc medium which can be rewritten on.

The record correcting system shown in the present embodiment may be controlled not only while the power supply is turned on, but also during the unoccupied time when the recording, reproducing and erasing operations are not required from the main apparatus. Also, the controlling operation may be performed so that the value of the record correction may be renewed at proper time intervals.

The record correcting system in the present embodiment of the present invention provides the following advantages.

(1) As the deviation from the optimum conditions may be detected directly from the reproduction waveform, the correction amount may be determined by one trial only.

(2) As all the processings are performed by the digital circuit, the operation is stable.

(3) As the correction accuracy of $\pm Tc$ is provided with respect to the period Tc of the input clock of the up, down counter, Tc may be made sufficiently small with respect to the recorded bit length, which may make it possible to provide correction of higher accuracy.

(4) As the average processing operation may be easily realized as shown in the embodiment, other factors except conditions caused by flaws on the disc may be removed.

(5) Also, repetition of the trial at proper time intervals allows characteristic variations between respective discs during disc exchange to be coped with.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An optical disc recording and reproducing apparatus, comprising:
    laser beam generating means for producing laser beams of variable power;
    recording means for recording information bit signals in the form of bits on an optical disc using laser beams of sequentially varied power produced by said generating means over a plurality of predetermined time periods; and
    power detecting means for detecting an optimal laser beam power, including
    means for producing information pulse signals corresponding to the bits recorded by said recording means over said plurality of time periods,
    means for comparing pulse widths of said information pulse signals with a reference pulse width and producing an output signal when said information pulse widths are at least equal to said reference pulse width, and
    means responsive to the output signal from said comparing means for determining the optimal laser beam recording power.

2. The optical disc apparatus in accordance with claim 1, wherein said information bit signals recorded on said disc by said recording means are of a constant frequency.

3. The optical apparatus in accordance with claim 1, wherein said power detecting means further comprises a signal edge detecting means for detecting the rising or falling edges of said information pulse signals, timer means started by said signal edge detecting means and producing timing signals, and a polarity determining means for determining the polarity of said information pulse signals with respect to the polarity of said timing signals.

4. The optical disc apparatus in accordance with claim 1, wherein said recording means comprises pulse width varying means for varying the pulse width of a driving signal applied to said laser beam generating means in order to produce laser beams of varying power.

5. The optical disc apparatus in accordance with claim 4, wherein said information bit signals recorded on said disc by said recording means are of a constant frequency.

6. The optical disc apparatus in accordance with claim 4 wherein said power detecting means further comprises a signal edge detecting means for detecting the rising or falling edges of said information pulse signals, timer means started by said signal edge detecting means and producing timing signals, and a polarity determining means for determining the polarity of said information pulse signals with respect to the polarity of said timing signals.

7. An optical disc recording and reproducing apparatus, comprising:
   recording means for recording a test pulse string containing a predetermined number of pulses on an optical disc recording medium;
   detecting means for determining the average difference between the pulse width duty ratio of each pulse in said pulse string and a reference duty ratio and producing a signal indicative thereof;
   recording correction means responsive to said signal produced by said detecting means for correcting the duty ratio of a data pulse string containing information to be recorded; and
   control means for controlling the operation of said recording means, detecting means and recording correction means.

8. The optical disc apparatus in accordance with claim 7, wherein said control means controls the record correcting operation during a time when information access is not demanded by a higher level apparatus.

* * * * *